Nov. 27, 1951 E. S. RINALDY 2,576,142
SINGLE OR OFFSET CONTACT TYPE MICROMETER GAUGE
Filed Nov. 29, 1949
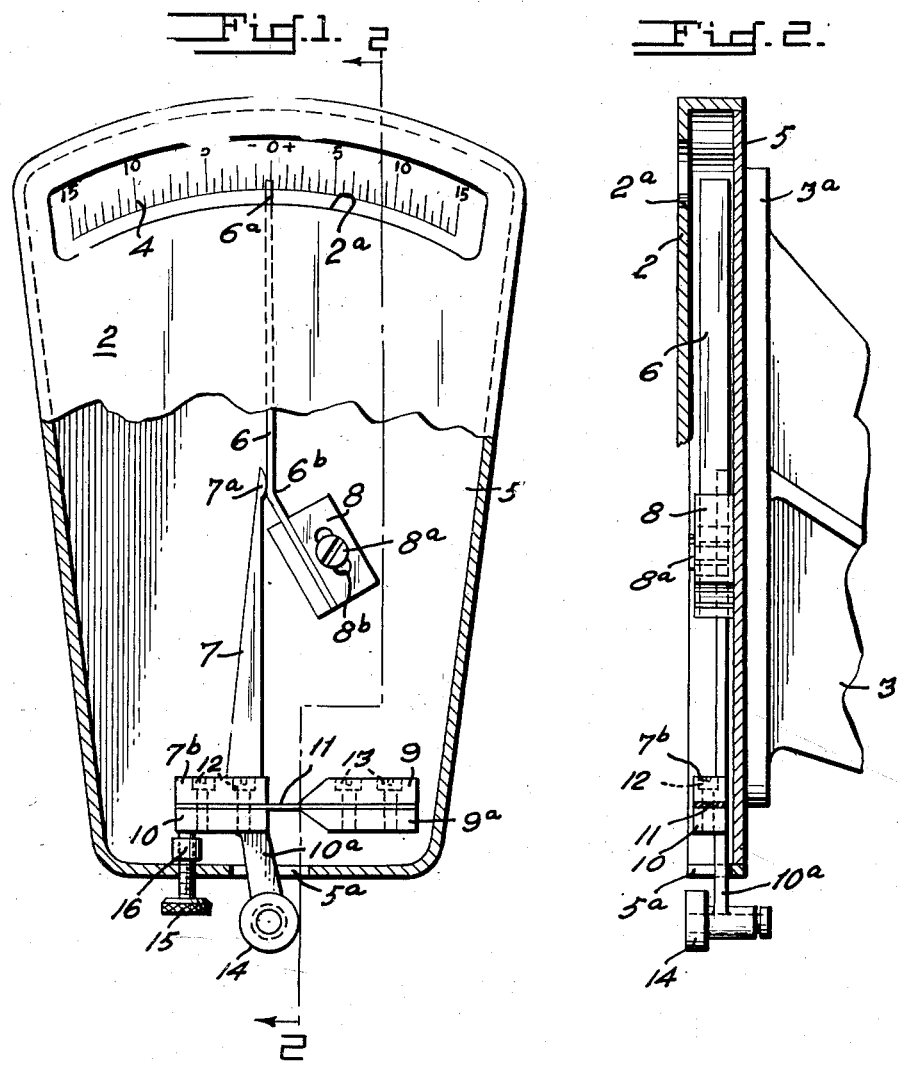
Inventor
Edward S. Rinaldy
By G. J. Kessenich & J. H. Church
Attorneys

UNITED STATES PATENT OFFICE 2,576,142

SINGLE OR OFFSET CONTACT TYPE MICROMETER GAUGE

Edward S. Rinaldy, Chester, N. J.

Application November 29, 1949, Serial No. 129,994

4 Claims. (Cl. 33—172)

(Granted under the act of March 3, 1883, as amended April 30, 1928; 370 O. G. 757)

The invention described herein may be manufactured and used by or for the Government for governmental purposes, without the payment to me of any royalty thereon.

This application is a division of my copending application, Serial Number 497,611, filed August 6, 1943, for Testing Device, now Patent No. 2,499,418 issued March 7, 1950.

It is the principal object of the invention to provide a single or offset type micrometer gage which is simple and inexpensive to construct, free from errors caused by play in worn bearings, long-lived, and easy to adjust, calibrate and repair.

Other objects and advantages will be apparent from the following description in connection with the drawing wherein, Figure 1 shows a front elevation with cover plate partly broken away, and Figure 2 is a sectional elevation taken in planes indicated by the line 2—2 of Figure 1.

Referring in detail to the drawing, 3 identifies a portion of a supporting arm having a base 3a adapted to be secured to, and rigidly mount an indicator casing 5 shown as generally flat in side elevation and sector-shaped in front elevation. A resilient blade or pointer 6 having one end bent as shown in Figure 1 and clamped in a block 8, adjustably secured as by means of a slot 8b and screw 8a to the rear wall of the casing. The pointer 6 has a resiliency urging its free end to the left, that is, counter-clockwise, as viewed in Figure 1. The free end of pointer 6 is pointed to form an indicator 6a movable over a conventionally-graduated scale 4 visible through an arcuate opening 2a in cover 2.

A lever or actuating arm 7 has an arcuate protuberance 7a engaging pointer 6 above and closely adjacent the bend 6b therein. This arm terminates at its lower end in a block portion 7b. A cooperating block portion 10 has a short, depending arm 10a passing through a slot 5a in the lower wall of the casing and provided with a contact or feeler 14 externally of the casing. Screws 12 act to draw together the confronting flat surfaces of blocks 7b and 10 and to clamp a resilient blade or spring arm 11 between them. The other end of this blade is clamped between blocks 9 and 9a, by screws 13. One or both blocks 9 and 9a are functionally integral with the rear wall of the casing.

A screw 15 is threaded into a block 16 secured within casing 5, and has its inner end in contact with block portion 10. Blade or spring arm 11 tends to spring downwardly under its inherent resilience so that block portion 10 is urged into contact with the end of adjusting screw 15. Since blade 6 is urged into counter-clockwise movement by its resiliency, it is continuously in contact with protuberance 7a.

Depending arm 10a, actuating arm 7 and feeler 14 together comprise an actuating element for moving pointer 6, the actuating element in turn being secured to spring arm or resilient blade 11 by means of blocks 10 and 7b. Spring arm 11 and blocks 9 and 9a form a spring arm assembly to support the actuating element for pivotal movement. When a force is applied to contact 14, arms 10a and 7 pivot as a unit because of the resiliency of blade 11, whereby the free end of arm 7 moves pointer 6 clockwise to give an accurate and highly magnified indication over scale 4, of the movement of contact 14.

In using the gage, for example to gage the outer races of ball bearings of, say, 1″ diameter, screw 15 is backed off until pointer 6a indicates the maximum "minus" measurement to be encountered. The instrument is then mounted by means of supporting arm 3 over a gaging surface, not shown, and adjusted by means of a master 1″ block between such surface and contact 14, until pointer 6a indicates zero. The gage is then fixed in this position. Thereafter, the races are passed between the gaging surface and contact 14 and any "under" or "over" dimensions thereof are noted and the acceptable races determined upon the basis of predetermined allowable tolerances.

I have thus provided a micrometer gage which is relatively simple, accurate, and long-lived. Furthermore, this gage will retain its inherent accuracy throughout its life because there are no bearings to become worn with consequent unreliable action. The parts are easily replaceable if broken, the accuracy is not affected by use in the presence of dust, and there is absolutely no play or back-lash to introduce erroneous indications.

While I have shown the preferred form of the invention as now known to me, various modifications, changes in shape and rearrangement of parts will occur to those skilled in the art after a study of the present disclosure. Hence I intend that the disclosure shall be taken in an illustrative rather than a limiting sense and wish to reserve all such modifications as fall within the scope of the sub-joined claims.

I claim:

1. A contact gage comprising a frame, a resilient pointer element having a first end fixed to said frame and its second end acting as a pointer, a scale on said frame in cooperative indicating relation with said pointer, a spring arm having one end clamped to said frame, an element comprising oppositely-directed actuating and article-contacting levers secured to the other end of said arm, said actuating lever being in substantial alignment with and having its free end in engagement with said pointer element adjacent its fixed end, whereby movement of said article contacting lever flexes said arm and imparts through said actuating lever, a magnified movement to said pointer.

2. In a feeler gage, a frame, a resilient indicator blade, means rigidly securing said indicator blade to said frame, whereby the free end of said blade may be flexed about a point closely adjacent said securing means, a spring arm having a first end rigidly clamped to said frame, first and second oppositely-extending levers fixed to the opposite end of said arm, said first lever in substantial alignment with said indicator blade being of greater length than said second lever and having its free end in operative contact with said indicator blade, closely adjacent said point, feeler means mounted upon the free end of said second lever, and scale means mounted on said frame in cooperative relationship with the free end of said blade and substantially concentric of said point.

3. In a gage of the opposed contact type, a casing, a resilient blade bent at an obtuse angle to form first and second sections of lesser and greater length, respectively, a first block fixed to said first end of said blade, there being a slot in said block parallel to said first end, a screw passing through said block and into said casing to secure the blade within said casing for flexing about a point substantially at the juncture of said sections, a spring arm in said casing and having one end rigidly secured to said casing, an actuating lever fixed at a first end to the other end of said arm and having its second end in contact with said second section of said blade, said second section and lever being in substantial parallelism, a feeler lever connected at one end with said arm in substantial alignment with said actuating lever and having its other end extending exteriorly of said casing, said blade and arm urging said levers in one direction of pivotal movement, and an abutment on said casing and engaging said feeler lever, to adjustably limit said movement.

4. In a gage, a frame, a pointer comprising a resilient blade, means fixed to said frame and rigidly clamping one end of said blade, an actuating element, means mounted on said frame to support said actuating element for pivotal movement and comprising a spring arm fixed at one end to said actuating element and at a second end to said frame, said actuating element including a first arm in substantial alinement with and having a free end in operative contact with said blade, and a second arm of less effective length than said first arm, feeler means carried by the free end of said second arm, and scale means on said frame in cooperative relationship with the free indicating end of said blade.

EDWARD S. RINALDY.

REFERENCES CITED

The following references are of record in the file of this patent:

UNITED STATES PATENTS

| Number | Name | Date |
|---|---|---|
| 499,199 | Bath | June 13, 1893 |
| 882,897 | Larava | Mar. 24, 1908 |
| 1,702,455 | Trumpler | Feb. 19, 1929 |
| 2,208,635 | Johnson | July 23, 1940 |